E. M. STERNBERG.
AUTOMOBILE TRUCK DIFFERENTIAL MECHANISM.
APPLICATION FILED NOV. 19, 1918.

1,334,325.

Patented Mar. 23, 1920.
2 SHEETS—SHEET 1.

WITNESS

T. F. Britt

INVENTOR

Ernst M. Sternberg
BY
Young & Young
ATTORNEY

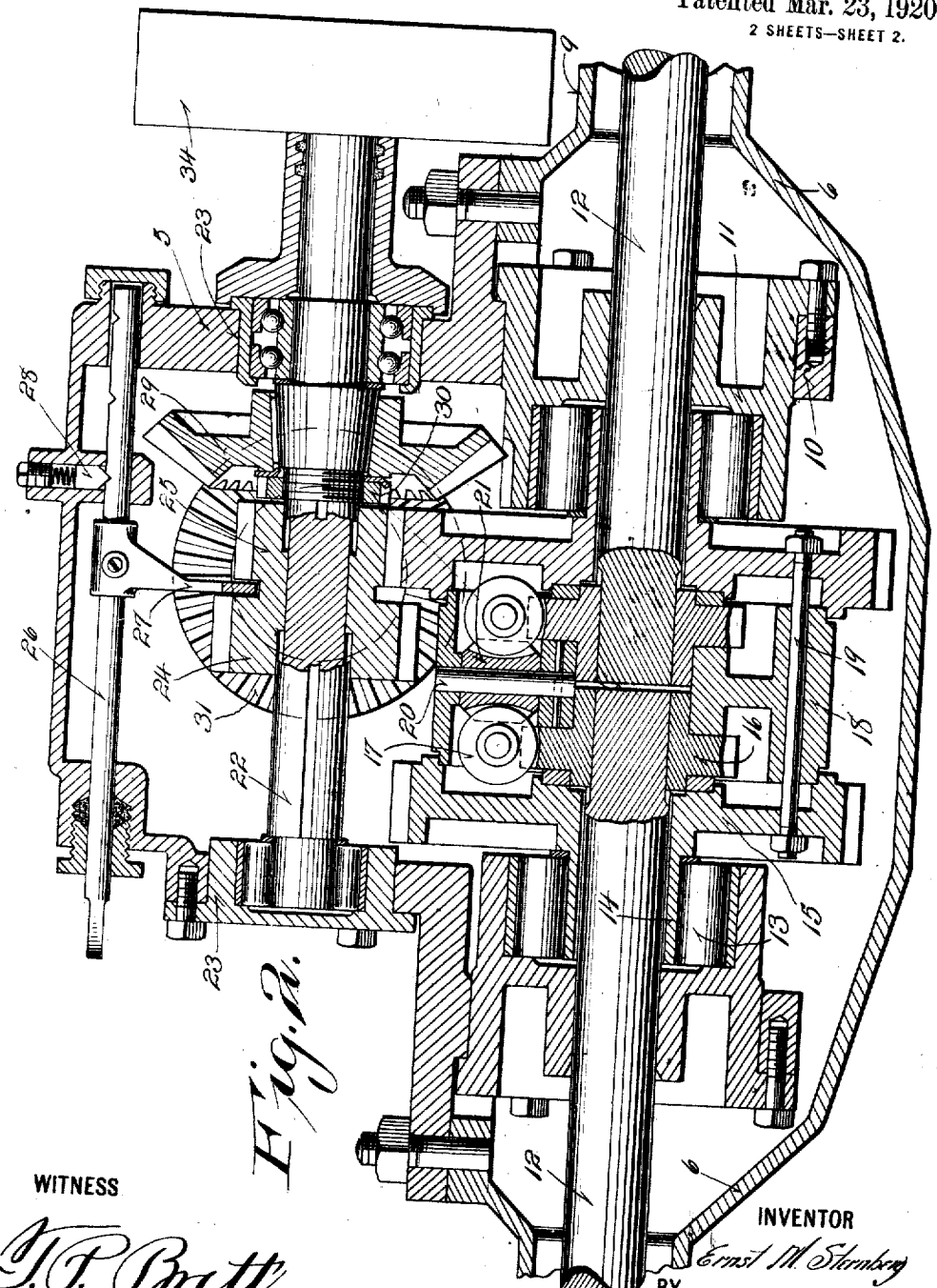

UNITED STATES PATENT OFFICE.

ERNST M. STERNBERG, OF WEST ALLIS, WISCONSIN.

AUTOMOBILE-TRUCK DIFFERENTIAL MECHANISM.

1,334,325.   Specification of Letters Patent.   Patented Mar. 23, 1920.

Application filed November 19, 1918. Serial No. 263,151.

*To all whom it may concern:*

Be it known that I, ERNST M. STERNBERG, a citizen of the United States, and resident of West Allis, in the county of Milwaukee and State of Wisconsin, have invented certain new and useful Improvements in Automobile-Truck Differential Mechanism; and I do hereby declare that the following is a full, clear, and exact description thereof.

My invention relates to new and useful improvements in the power transmitting systems of automobile trucks, and is more particularly directed to the provision of an improved differential mechanism.

In the operation of an automobile truck, as in any other power system utilizing an internal combustion engine for its source of power, it is highly desirable to procure, when traveling, a constant operation of the engine under the full load conditions for which it is designed, in accordance with the established principles of engine operation. Considerable difficulty has heretofore been encountered, particularly with respect to automobile trucks of the heavier type, in maintaining constant load conditions of the engine in the various uses of the truck. As an example of the variation of load, apart from conditions of grade, it may be noted that a seven ton truck weighs approximately 10000 lbs. and the total load of a truck would thus vary from this weight when the truck is empty, to a weight of 24000 lbs., when the truck is fully loaded.

It is therefore primarily the object of my invention to provide means in an automobile truck for the maintenance of an even load upon the engine under the widely variant operative conditions of the truck to thus procure a maximum conservation of oil, fuel and wear of the motor parts, and it is more particularly an object to provide an exceedingly wide range of the power ratio by the provision of a variable speed connection for the differential, which coacts therewith in a most compact and efficient manner.

A further object incidental to the accomplishment of the foregoing main object resides in the provision of an arrangement wherein a double reduction of power may be procured in the differential mechanism.

A still further object resides in the provision of an arrangement whereby the propeller shaft of the power plant may be disconnected from the differential mechanism to prevent back driving of the propeller shaft incidental to coasting of the truck.

A still further object resides in the provision of a braking arrangement associated with the differential, which effects a maximum brake leverage.

A still further object resides in the provision of an arrangement wherein the foregoing advantages may be embodied in a differential mechanism at a minimum increase of manufacturing cost over conventional types of differential mechanisms and propeller shaft connections therewith, and it is a more detailed object in this connection to utilize the differential end housing members as selective drive gears for the differential mechanism.

With the above and other objects and advantages in view, which will be apparent as the description proceeds, my invention resides in the novel features of construction, combination and arrangement of parts as hereinafter described and defined by the appended claims.

In the accompanying drawings:

Fig. 2 is a vertical sectional view therethrough on the line 2—2 of Fig. 1.

Figure 1:
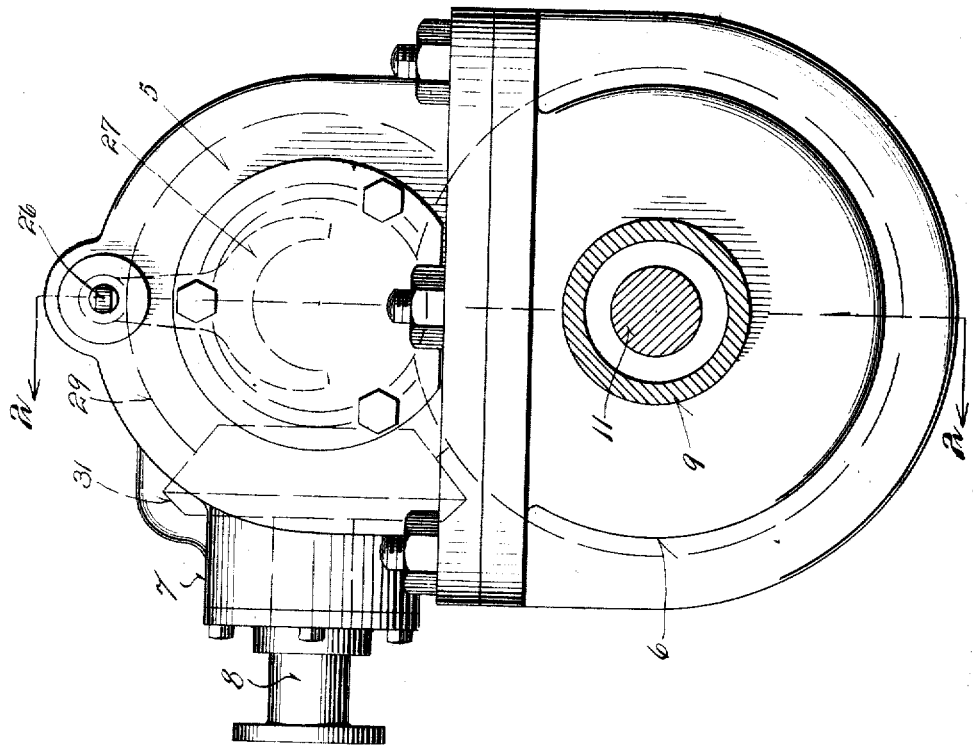
Figure 1 is an elevational view of a variable speed differential mechanism embodying my invention.

Referring now more particularly to the accompanying drawings, 5 and 6 designate respectively upper and lower sections of the casing of my improved differential, the upper section having a bearing extension 7 for the propeller shaft 8 of the power plant, while the ends of the lower casing sections are extended to form axle housings 9. The upper casing section 5 carries the conventional depending ring portions 10 in which are mounted bearing castings 11 for a pair of wheel drive shafts 12 extending through the axle housings. The bearing castings 11 mount bearing rollers 13 which engage on outwardly projected sleeves 14 carried by end housing members 15 of the differential mechanism.

This differential mechanism is of the well known locking type, embodying worm gear wheels 16 on the ends of the wheel drive shafts 12 which mesh with worms 17 carried by a housing annulus 18 which is secured between the end housing members 15 by bolts 19 passed through said members and the annulus. The annulus also carries a radial shaft 20 on which is mounted a worm gear 21 meshing with both of the worms 17.

In the present structure, the end members 15 of the differential housing are formed with peripheral series of gear teeth and constitute gear wheels of different sizes whereby either of two differing rotative speeds may be imparted to the differential mechanism. A jack shaft 22 is mounted in bearing blocks 23 secured to the upper main casing section 5, and a pair of gear wheels 24 and 25 of relatively large and small size are provided, having a common hub portion splined on the jack shaft whereby either of the gear wheels may mesh with the corresponding housing gear wheel 15, or whereby both gear wheels may lie between the housing gear wheels in neutral position. The gear wheels 24 and 25 are shifted by a rod 26 having spanner connection 27 with said gear wheels, said rod being yieldably held in its various positions by a conventional spring detent 28. One end portion of the jack shaft is enlarged in frusto conical form to receive a beveled gear wheel 29 keyed on said enlarged portion and held in place by a nut 30 threaded on the shaft. This beveled gear wheel is of relatively large size and meshes with a smaller gear wheel 31 on the end of the propeller shaft.

An exceedingly simple, compact and efficient arrangement has thus been provided whereby the number of gear ratios of the ordinary transmission are doubled to thus provide an adequate range for the exceedingly variant load conditions encountered in trucks of the heavier type as heretofore explained.

It is thus seen that my greatly increased range of gear ratios is procured in an exceedingly compact manner, departing to a minimum extent from conventional automobile truck design and thus permitting the embodiment of my invention in conventional truck structures at a minimum added cost, it being particularly noted that the two speed gears of the differential form the conventional housing ends of said mechanism and coact in procuring a structure of maximum simplicity. It is observed that when one of the gears 24 is in mesh with its corresponding housing gear 25, the others gears are out of mesh, thus preventing wear. Also it is noted that when the gears 24 and 25 are in neutral position, the rotation of the wheel drive shafts 12 incidental to coasting of the vehicle will not be transmitted to the propeller shaft and main transmission connections. The jack shaft 22 is extended from the main casing and carries a wheel 34 which may be used either for taking off power, or as a brake, and it is noted that a maximum brake leverage is thus attained by reason of the leverage reduction between the gears 24 and 25 and their corresponding housing gears 15. It is further noted that a double reduction of the gear ratio is procured in the present arrangement by the different sizes of the coacting sets of gears, this double reduction being procured in a manner utilizing the essential elements to procure the variable drive of the differential.

Also, the variable drive of the differential is procured by the simple addition of an extra pair of gears and a splined connection on the parts which must be provided in a single speed structure. Hence, I avoid the addition of bearings and all extra parts entailing a complicated lubricating system in the differential, it being noted that none of the parts of my improved mechanism are superimposed or require clutch connections other than the simple clutch effected by shifting the double gear out of mesh with either of the gears 17.

My improved structure has minimum frictional resistance, which is an exceedingly important consideration in view of the heavy loads of an automobile truck.

What is claimed is:

1. A mechanism of the class described including a pair of shafts, a differential mechanism for said shafts including end housing members surrounding the shafts and provided with peripheral series of gear teeth, a jack shaft, and gears on said jack shaft selectively engageable with the gear teeth of the differential mechanism.

2. A mechanism of the class described including a pair of shafts, combined gear wheels and housing members on the adjacent end portions of the shafts, an annulus disposed between and secured to said combined gear wheels and housing members, differential gear members mounted in said annulus, gear members on the shafts meshing therewith, a jack shaft, and gears on said jack shaft selectively engageable with the combined gear wheels and housing members.

3. A mechanism of the class described including a main casing, bearing members in the casing, a pair of shafts extending through said bearing members, combined gear wheels and end housing members having sleeve portions engaged in said bearing members of the main casing, an annulus disposed between and secured to said combined gear wheels and end housing members, differential gear members mounted in said annulus, gear members on the shafts meshing therewith, a jack shaft, and gears on said jack shaft selectively engageable with the combined gear wheels and housing members.

4. A mechanism of the class described including a pair of shafts, a differential mechanism for said shafts including end housing members surrounding the shafts and provided with peripheral series of gear teeth, a jack shaft, and a double gear splined on the jack shaft and provided with an intermediate annular groove, a gear shifting member engaged in said groove, said double gear member having two series of gear teeth adapted for selective engagement with the said gear teeth of the differential mechanism and being adapted for disposition between the series of gear teeth of the differential mechanism in a position free for contact with the gear teeth thereof.

In testimony that I claim the foregoing I have hereunto set my hand at Milwaukee, in the county of Milwaukee and State of Wisconsin.

ERNST M. STERNBERG.